March 18, 1947.  P. G. DAMSTRA  2,417,587
CLOTHESLINE REEL
Filed June 18, 1945

Inventor
Peter G. Damstra
By Liverance and
Van Antwerp
Attorneys

Patented Mar. 18, 1947

2,417,587

UNITED STATES PATENT OFFICE 2,417,587

CLOTHESLINE REEL

Peter G. Damstra, Holland, Mich.

Application June 18, 1945, Serial No. 600,014

4 Claims. (Cl. 242—101)

This invention relates to a reel particularly useful in winding and tensioning a line as much as may be desired, and for holding it against unwinding when a desired tension thereof has been accomplished. One place of use and the one where it has been practiced is in connection with clotheslines.

It is a primary object and purpose of the present invention to provide a simply constructed, economically built and practically effective reel for the purposes stated, an understanding of which may be had from the following description taken in connection with the accompanying drawing, in which, Fig. 1 is a perspective view of the reel with the cover for it to one side thereof.

Like reference characters refer to like parts in the different figures of the drawing.

The reel is preferably mounted upon a tubular rod 1 which is supported in a horizontal position in any suitable manner at a selected distance above the ground. Where the reel is to be mounted the tube is pressed inwardly to provide a continuous annular groove 2, the formation of such groove being readily accomplished with the tubes such as the tube 1. The reel may also be applied to a solid rod in which case a groove 2 would be machined therearound.

Figure 1:
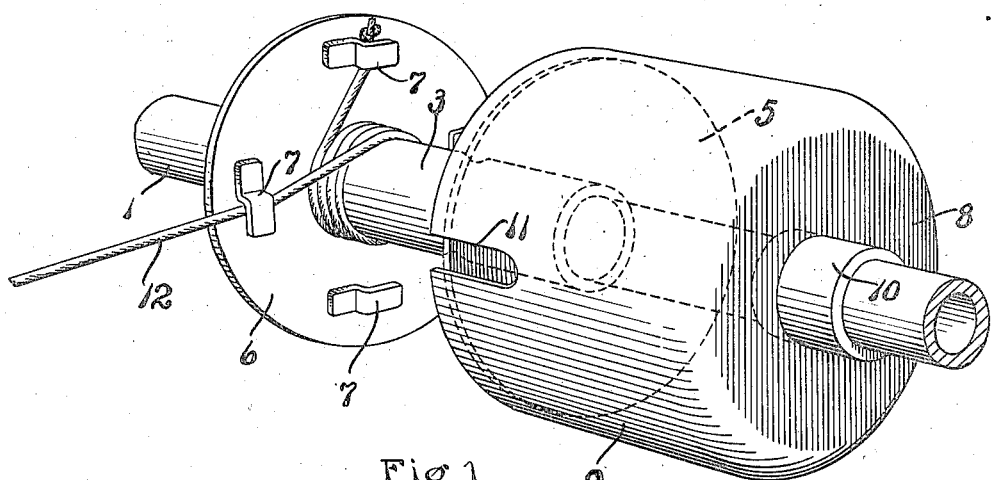

In construction the reel includes a sleeve 3 of an interior diameter such that it may be freely passed over the tubular rod 1 and preferably midway between its ends it is interlocked with the groove 2 by the inward pressing of a cooperating rib 4 around the sleeve, said sleeve 3 is freely turnable about the tube 1. At one end of the sleeve 3 an end plate 5 for the reel of sheet metal is provided and permanently secured. Said end 5 is preferably of circular form and is plain and unobstructed on both sides. The reel is completed by securing a similar plate 6 secured to or adjacent the oppostie end of the sleeve 3. At its inner side at a plurality of spaces around it adjacent its periphery hook members 7 are spot welded or otherwise permanently secured to the face of the end 6, preferabl ybeing stamped into a substantially Z-form, one flange bearing against and welded or otherwise secured to the end plate 6, and the other being spaced a short distance therefrom, as shown in Fig. 1, and in dotted lines in Fig. 2.

Figure 2:
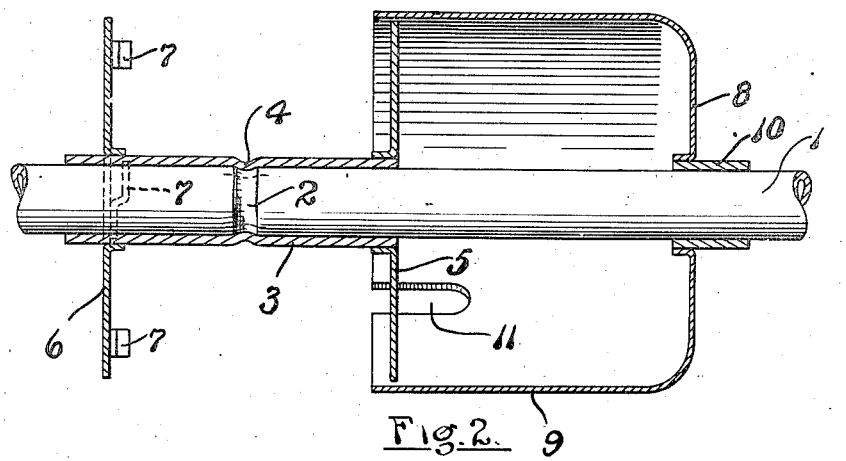
Fig. 2 is a longitudinal vertical section therethrough.
Figure 3:
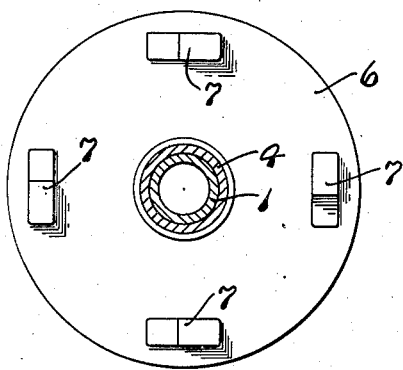
Fig. 3 is a horizontal section through the reel.

The reel is adapted to be covered by a movable cover pressed from sheet metal and of a cup form having a bottom 8 and cylindrical sides 9. At the closed end or bottom 8 a central opening is made in which a short sleeve 10 is inserted and secured. Such sleeve has an interior diameter such that it may freely pass over the tubular rod 1, whereby the cover may be moved lengthwise of said tubular rod into the position to uncover the reel as in Figs. 1 and 2; or by moving the cover to the left, the reel is completely housed within said cover. At one point in the edge of the cylindrical sides 9 and extending toward the bottom a slot 11, as in Fig. 2, is cut.

The line 12 may be connected to the end 6 of the reel by providing a large enough knot at one end thereof and engaging it with one of the hook members 7. The reel may be turned as much as is necessary to wind the line on the sleeve 3 until the desired tension is obtained and then the line placed underneath a second hook 7, as shown in Fig. 1, disposed outward from the sleeve 3 in the direction in which the line extends. When thus connected with the second hook member 7 the reel is held against unwinding. The cover may be moved to its operative covering position, the slot 11 forming a passage for the line which otherwise would be engaged by the edge of the cover sides at the open end thereof. To release and remove the line the cover is moved to its uncovered position as in Fig. 1, the line disengaged from the last mentioned hook member 7 and the reel unwound until its end may be disengaged from the member 7 with which it is releasably connected.

The reel remains in permanent association and connection with the horizontal tubular rod 1 and the line 12 may be left in connection with the reel or removed, as may be desired. The construction is of a simple character, readily produced and installed in its place of utility and has proved very effective and useful in practice.

The invention is defined in the appended claims and is to be considered comprehensive of all forms of structure coming within their scope.

I claim:

1. In a construction as described, a horizontal tubular support provided with an annular inwardly pressed groove between its ends, a tubular sleeve located over said support and turnable about the horizontal axis thereof, said sleeve having an inwardly pressed annular rib received in said groove, circular end plates connected to said sleeve and spaced from each other, and a plurality of spaced apart means secured at the inner side of one of said end plates adjacent the periphery thereof, with one of which a line may be connected and against another of which said line may be brought at the under side thereof when said line has been wound and tensioned, said second mentioned means being located outwardly from said sleeve in the direction of the line extension.

2. In a structure as described, a horizontal tubular support having a continuous annular groove therearound between its ends, a cylindrical sleeve located over said support provided between its ends with an inwardly pressed annular rib seated in said groove, said sleeve being turnable about the horizontal axis of the support, end plates connected to said sleeve and spaced apart from each other, said end plates being of circular outline, and a plurality of spaced apart members secured to the inner side of one of said end plates, said members having one end portion lying against the inner side of said end plate and permanently secured thereto, and each having a section extending at right angles from one end of said end portion and terminating in a section spaced from the inner side of said end plate, as specified.

3. A construction as defined in claim 2, and a covering member mounted on said tubular support comprising, a cup having cylindrical sides and a bottom, said bottom having a central opening therethrough, a sleeve extending through said opening and connected to the bottom, said tubular support passing through said sleeve, and said sides of the cup at a part thereof being provided with a horizontal slot open at its outer end at the free end of said cup, and extending toward the bottom thereof.

4. In a structure as described, an elongated cylindrical support, a reel located thereon including a sleeve through which said support passes, end plates spaced from each other secured to said sleeve, one of said end plates at its inner side having a plurality of spaced line engaging members secured to and extending inwardly therefrom, said sleeve being freely rotatable about the support, interengaging means on the sleeve and support for maintaining said sleeve against longitudinal movement on said support, and a cover member for said reel comprising, a cup having a bottom and sides extending therefrom, said bottom having an opening therethrough, a sleeve located at said opening and connected to the bottom of the cup, said sleeve being mounted on said support and slidable thereon, the cup having its open end presented toward said reel, and the sides thereof being spaced outwardly a sufficient distance that they may pass over the end plates of the reel, as specified.

PETER G. DAMSTRA.

REFERENCES CITED

The following references are of record in the file of this patent:

UNITED STATES PATENTS

| Number | Name | Date |
|---|---|---|
| 1,281,802 | Madill | Oct. 15, 1918 |